(12) United States Patent
Huang et al.

(10) Patent No.: US 10,717,365 B2
(45) Date of Patent: Jul. 21, 2020

(54) SYSTEM AND METHOD FOR LIMITING MOTION IN AN INDEPENDENT CART SYSTEM

(71) Applicant: Rockwell Automation Technologies, Inc., Mayfield Heights, OH (US)

(72) Inventors: Yuhong Huang, Acton, MA (US); Oliver C. Haya, Milwaukee, WI (US); Neil R. Bentley, Westborough, MA (US); Robert H. Schmidt, Germantown, WI (US); Eric J. Wildi, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 116 days.

(21) Appl. No.: 16/034,988

(22) Filed: Jul. 13, 2018

(65) Prior Publication Data

US 2020/0017308 A1    Jan. 16, 2020

(51) Int. Cl.
| | |
|---|---|
| *B60L 15/00* | (2006.01) |
| *B60L 13/03* | (2006.01) |
| *B65G 35/06* | (2006.01) |
| *B65G 54/02* | (2006.01) |
| *B65G 19/02* | (2006.01) |
| *B65G 43/00* | (2006.01) |
| *H02P 25/064* | (2016.01) |

(52) U.S. Cl.
CPC ............. *B60L 15/005* (2013.01); *B60L 13/03* (2013.01); *B65G 19/02* (2013.01); *B65G 35/06* (2013.01); *B65G 43/00* (2013.01); *B65G 54/02* (2013.01); *H02P 25/064* (2016.02); *B60L 2200/26* (2013.01); *B65G 2203/0283* (2013.01); *B65G 2203/0291* (2013.01); *B65G 2203/043* (2013.01)

(58) Field of Classification Search
CPC .............................. B60L 15/005; B65G 35/06
See application file for complete search history.

(56) References Cited

U.S. PATENT DOCUMENTS

| | | |
|---|---|---|
| RE39,747 E | 7/2007 | Peltier et al. |
| 7,448,327 B2 | 11/2008 | Thornton et al. |
| 8,863,669 B2 | 10/2014 | Young et al. |
| 9,346,371 B2 | 5/2016 | King et al. |

(Continued)

*Primary Examiner* — Thomas Randazzo
(74) *Attorney, Agent, or Firm* — Boyle Fredrickson, SC (57) ABSTRACT

A controller for an independent cart system simplifies programming and automatically adapts operation each mover travelling along a track. The controller includes a configuration table defining segments of the track, which includes a maximum velocity and/or a maximum acceleration for each mover within the segment. A motion command for a mover commands motion across multiple segments between the starting point and the ending point. As the mover travels, the controller receives a position feedback signal corresponding to the present location of the mover. The controller obtains the maximum velocity and/or maximum acceleration for the mover corresponding to the segment in which it is located. The controller automatically adjusts the speed and/or acceleration of the mover along the segment in which it is presently located. As the mover transitions between segments, the controller automatically adjusts the speed and/or acceleration according to the new segment in which the mover is located.

20 Claims, 6 Drawing Sheets

(56) References Cited

U.S. PATENT DOCUMENTS

| | | | |
|---|---|---|---|
| 9,997,985 B2 | 6/2018 | Prussmeier | |
| 2007/0290638 A1 | 12/2007 | Faizullabhoy et al. | |
| 2008/0006172 A1 | 1/2008 | Thornton | |
| 2015/0344233 A1* | 12/2015 | Kleinikkink | B65G 43/10 |
| | | | 700/230 |
| 2015/0360581 A1 | 12/2015 | King et al. | |
| 2016/0355350 A1* | 12/2016 | Yamamoto | G05B 19/4189 |
| 2017/0229991 A1* | 8/2017 | Huber | B65G 43/00 |
| 2018/0090254 A1* | 3/2018 | Ozimek | H02P 5/00 |
| 2019/0084781 A1* | 3/2019 | Huang | G05B 19/195 |
| 2019/0097552 A1* | 3/2019 | Das | H02P 25/064 |

* cited by examiner

| Zone | Start | Stop | Max Vel. | Max Acc. |
|---|---|---|---|---|
| A | 0 | 15000 | 2.0 | 2.0 |
| B | 15000 | 16000 | 0.5 | 1.0 |
| C | 16000 | 17000 | 0.2 | 0.5 |
| D | 17000 | 19000 | 2.0 | 2.0 |
| E | 19000 | 30000 | 2.0 | 2.0 |
| F | 16000 | 18000' | 1.0 | 1.0 |
| G | 18000' | 19000' | 0.2 | 0.5 |
| H | 19000' | 20000' | 0.2 | 0.5 |
| I | 20000' | 21000' | 0.2 | 0.5 |
| J | 21000' | 22000' | 1.0 | 1.0 |
| K | 22000' | 19000 | 0.2 | 0.5 |

SYSTEM AND METHOD FOR LIMITING MOTION IN AN INDEPENDENT CART SYSTEM

BACKGROUND INFORMATION

The subject matter disclosed herein relates to a motion control system with independent carts and a linear drive system. More specifically, the system and method provides ease of operation and automatic adjustment to the speed of travel for the independent carts as they are moved along the linear drive system.

Motion control systems utilizing movers and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts or "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a path, which could be a closed path, over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

While the mover is travelling along the different segments for filling, machining, placing, returning, and the like or while the mover is travelling along different lengths of track, curves of varying radii, and the like, it may be desirable to command the mover to travel at a different velocity. For example, a curve having a short radius may require the mover to travel at a slower velocity than a curve having a long radius to avoid undesirable centrifugal forces applied to the product on the mover causing damage and/or loss of product. The centrifugal forces applied to the mover may also increase wear on bearings, wheels, and the like. Similarly, it may be desirable to travel at a greater rate of speed along a long straight segment of track when returning an empty mover to a starting position than along a short segment of track when the mover is traveling between stations while loaded with a product.

Historically, it has been necessary for a programmer to generate a sequence of commands for each mover as it travels across each of the different segments. Each command includes a desired velocity and a desired distance for the mover to travel. Further, the programmer must know whether the mover is to stop at the end of travel, continue traveling with an additional move command, and whether the mover is to change velocity or continue at a constant velocity prior to the end of the travel distance. Further, the commands may vary between movers as a function of the loading of the mover. Depending on the configuration of the track, controlling operation of a mover between two positions on the track requires the programmer to generate a series of commands, having five, ten, or even a greater number of commands to control the mover as it travels across the multiple segments of the track between the start position and the end position. Programming movers to travel along the track requires significant knowledge about the configuration of the track, the movers, and the operations being performed along the track and often results in a complex series of commands for each mover to achieve a desired operation of each mover.

Thus, it would be desirable to provide a system and method to simplify programming of the movers.

It is further desirable to provide a system and method that will automatically adapt operation of each mover as it travels along the track.

BRIEF DESCRIPTION

The subject matter disclosed herein describes a system and method for controlling operation of an independent cart system, where the independent cart system includes multiple movers traveling along a linear drive system. The system and method for controlling the independent cart system simplifies programming of the movers and automatically adapts operation of each mover as it travels along the track. A controller for the independent cart system includes a configuration table defining segments of the track. For each segment of the track, the configuration table includes a maximum velocity and may further include a maximum acceleration for each of the movers to travel along the segment. A motion command for a mover identifies a starting point on the track and an ending point along the track. Multiple segments, as defined by the configuration table, exist between the starting point and the ending point. As the mover travels between the starting point and the ending point, the controller receives a position feedback signal corresponding to the present location of the mover. The controller obtains the maximum velocity and/or maximum acceleration for the mover as defined in the configuration table corresponding to the segment in which the mover is located. The controller automatically adjusts the speed and/or acceleration at which the mover is travelling along the segment in which it is presently located. As the mover transitions between segments, the controller automatically adjusts the speed and/or acceleration according to the new segment in which the mover is located. Thus, commanding motion of each mover is greatly simplified as a single motion command controls operation of the mover along multiple segments, and the controller automatically adapts operation of the mover as it travels across the multiple segments defined between the start and end positions within the motion command.

In one embodiment of the invention, an independent cart system includes multiple movers traveling along a track of a linear drive system, where each mover includes at least one drive magnet. The track includes multiple drive coils positioned along a length of the track. The drive coils are selectively energized to establish an electromagnetic field interacting with the at least one drive magnet on each mover to drive each mover along the track, and the track includes multiple zones defined along the length of the track. The independent cart system also includes a controller having a memory device operative to store a track configuration table and a processor. The processor is operative to receive a desired motion command for each of the movers and to receive a position feedback signal corresponding to a location for each of the movers along the length of the track. The desired motion command includes at least one of a desired acceleration and a desired velocity at which the mover is driven during the desired motion command. The processor is further operative to read either a maximum velocity or a maximum acceleration from the track configuration table corresponding to the location for each of the movers along the length of the track and to limit either an actual velocity or an actual acceleration of each of the movers to a lesser of the desired velocity or the maximum velocity and to the lesser of the desired acceleration or the maximum acceleration, respectively.

According to another embodiment of the invention, a method for controlling operation of multiple movers traveling along a linear drive system is disclosed. A desired motion command is received at a controller for each of the movers, where the desired motion command includes at least one of a desired acceleration and a desired velocity at which the mover is driven during the desired motion command. A position feedback signal is received at the controller corresponding to a location for each of the movers along a length of a track for the linear drive system. At least one of a maximum velocity and a maximum acceleration is read from a track configuration table corresponding to the location for each of the movers along the length of the track, and either an actual velocity or an actual acceleration of each of the movers is limited to a lesser of the desired velocity or the maximum velocity and to the lesser of the desired acceleration or the maximum acceleration, respectively.

According to still another embodiment of the invention, a controller for an independent cart system is disclosed. The independent cart system includes multiple movers traveling along a linear drive system, and the controller includes a memory device and a processor. The memory device is operative to store a track configuration table, where the track configuration table defines a plurality of zones along a length of a track on which a plurality of movers travel along the linear drive system, the track configuration table includes at least one of a maximum velocity and a maximum acceleration for each of the plurality of zones, and the processor identifies one of the plurality of zones in which each mover is located as a function of the location for each mover. The processor is operative to receive a desired motion command for each of the plurality of movers and to receive a position feedback signal corresponding to a location for each of the plurality of movers along the length of the track. The desired motion command includes at least one of a desired acceleration and a desired velocity at which the mover is driven during the desired motion command. The processor is further operative to read at least one of the maximum velocity and the maximum acceleration for one of the plurality of zones from the track configuration table corresponding to the location for each of the plurality of movers along the length of the track, and to limit one of an actual velocity and an actual acceleration of each of the plurality of movers to a lesser of the desired velocity or the maximum velocity and to the lesser of the desired acceleration or the maximum acceleration, respectively.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 7b is a configuration table defining a plurality of sections in the exemplary track layout of FIG. 7a.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

With respect to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In one embodiment, track segments 12 may be joined to form a generally closed loop supporting a set of independent carts, also referred to herein as movers, 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

Figure 2:
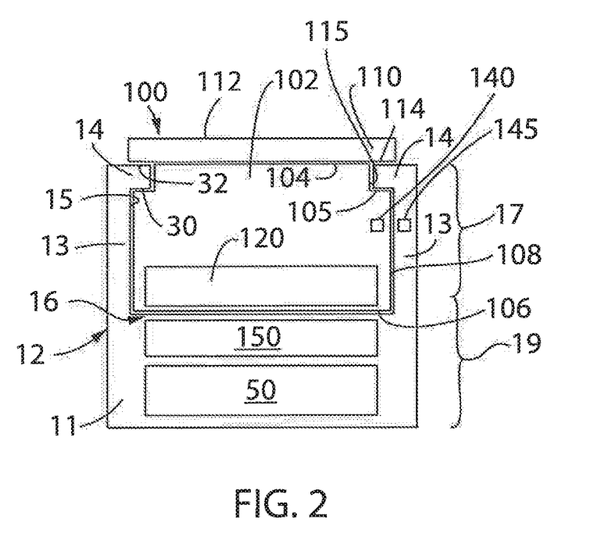
FIG. 2 is a sectional view of an exemplary mover and track segment included in the linear drive system taken at 2-2 of FIG. 1.
Figure 3:
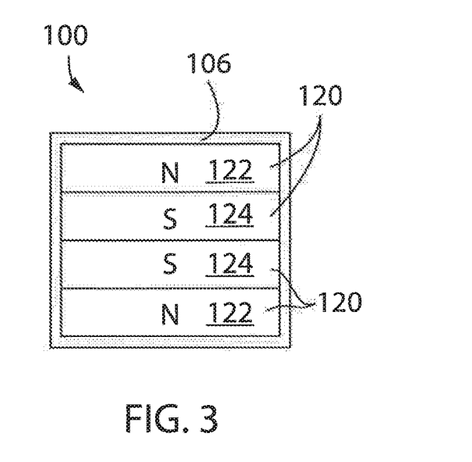
FIG. 3 is a bottom plan view of the exemplary mover of FIG. 2.
Figure 4:
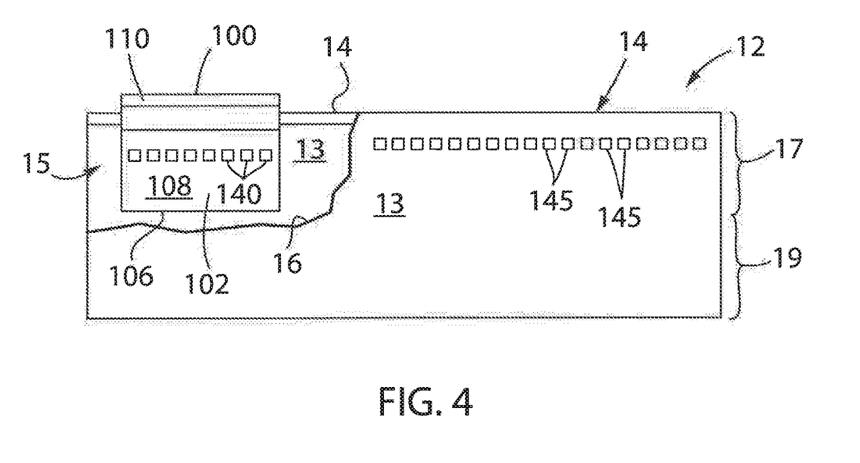
FIG. 4 is a partial side cutaway view of the mover and track segment of FIG. 2.

According to the illustrated embodiment, each mover 100 is configured to slide along the channel 15 as it is propelled by a linear drive system. The mover 100 includes a body 102 configured to fit within the channel 15. In one embodiment, the body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 10$. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 15 in which the rail 14 runs. The channel 15 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing inward to the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
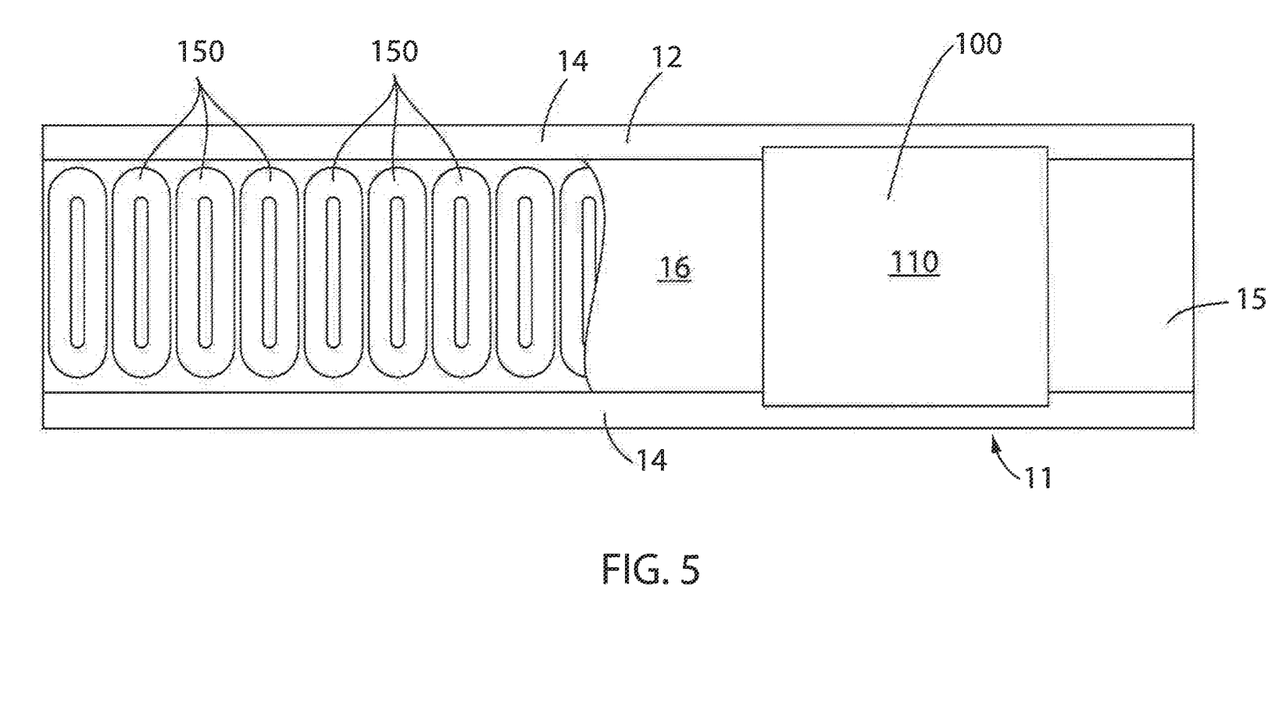
FIG. 5 is a partial top cutaway view of the mover and track segment of FIG. 2.

The linear drive system further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

A segment controller 50 is provided within each track segment 12 to control the linear drive system and to achieve the desired motion of each mover 100 along the track segment 12. Although illustrated as blocks in FIG. 1 external to the track segments 12, the illustration is to facilitate illustration of interconnects between controllers. As shown in FIG. 2, it is contemplated that each segment controller 50 may be mounted in the lower portion 19 of the track segment 12. Each segment controller 50 is in communication with an adjacent segment controller 50 and a central controller 170 which is, in turn, in communication with an industrial controller 200. Accordingly, each segment controller 50 can interact with other controllers to establish routing and global move parameters to re-create overall commands from the industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as the travel along the line. In other embodiments, robotic assembly stations may perform various assembly and/or machining tasks on workpieces carried along by the movers 100. The exemplary industrial controller 200 includes a power supply 202 with a power cable 204 connected, for example, to a utility power supply; a communication module 206 connected by a network medium 160 to the central controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a central controller 170 where the central controller 170 operates to generate commands for each segment controller 50.

Figure 6:
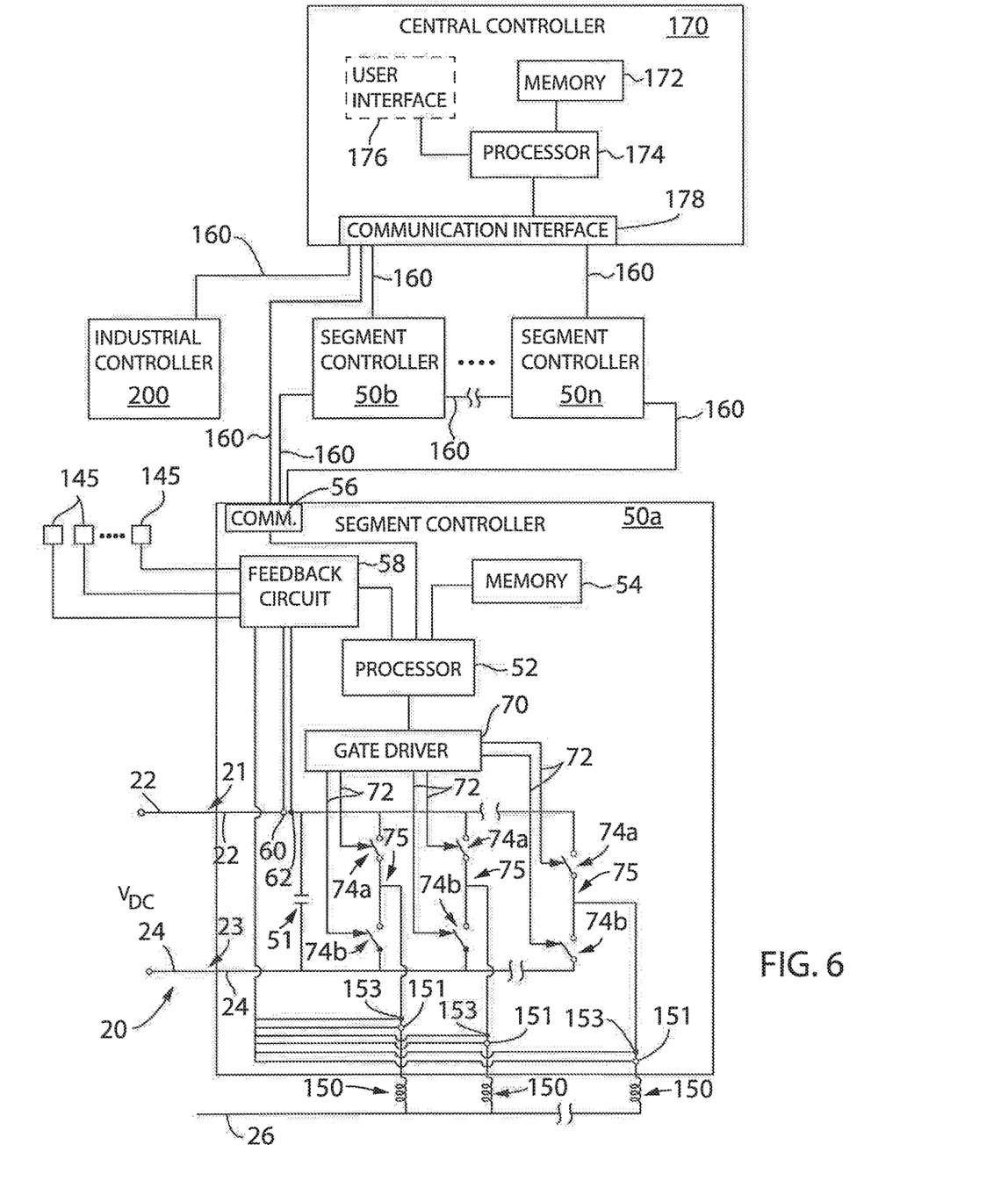
FIG. 6 is a block diagram representation of the exemplary control system of FIG. 1.

With reference also to FIG. 6, the central controller 170 includes a processor 174 and a memory device 172. It is contemplated that the processor 174 and memory device 172 may each be a single electronic device or formed from multiple devices. The processor may be a microprocessor. Optionally, the processor 174 and/or the memory device 172 may be integrated on a field programmable array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 can receive instructions for coordinating with industrial processes or machines. In one aspect, known as "centralized" control, the central controller 170 can determine one or more motion profiles for the movers 100 to follow along the track 10. A program executing on the processor 174 is in communication with each segment controller 50 on each track segment via a network medium 160. The central controller 170 may transfer a command signal to one or more power segments in each track segment to control energization of the coils 150. The central controller 170 may receive feedback signals corresponding to the identification and/or location of movers 100 along each track segment and control motion of the movers 100 directly from the central controller 170. In one embodiment of the invention, it is contemplated that the central controller 170 may be implemented within the industrial controller 200 as either a portion of the control program executing in the processor module 208 or as a dedicated motion control module inserted within one of the slots of the industrial controller 200.

In another aspect, known as "distributed" control, the central controller 170 may be configured to transfer the desired motion commands, or a portion thereof, from the central controller 170 to each of the segment controllers 50. The motion commands identify one or more desired movers 100 to be positioned at or moved along each track segment 12. The central controller 170 may distribute motion commands to each segment controller 170 according to the mover located at or proximate to the track segment 12. The corresponding segment controller 50 for each track segment 12 may, in turn, determine the appropriate command signals for each mover 100 and transmit the command signals to one or more power segments in each track segment to control energization of the coils 150. Distributed control can minimize the amount of communication in the system by allowing segment controllers 50, rather than the central controller 170, to control driving each mover 100 along the track 10.

A position feedback system provides knowledge of the location of each mover 100 along the length of the track segment 12 to the segment controller 50. In one embodiment, the position feedback system can include one or more position magnets 140 mounted to the mover 100 and an array of sensors 145 spaced along the side wall 13 of the track segment 12. The sensors 145 are positioned such that each of the position magnets 140 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GME) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 which corresponds to the magnet 140 passing the sensor 145.

The segment controller 50 controls operation of the mover 100 to execute the motion profile, whether generated by the central controller 170 or generated locally. The segment controller 50 may include a position and/or a velocity loop to regulate the position of each mover 100. Each mover 100 includes at least one position magnet 140 and, according to the illustrated embodiment, each mover 100 includes an array of position magnets 140 mounted on the mover 100. In another aspect, one or more magnets can instead be used as both the drive magnet and the position magnet. The position magnets 140 pass by an array of position sensors 145 as the mover 100 travels along the track segment, generating position feedback signals 225. A position loop may utilize the position feedback signals 225 directly to regulate the position of the mover 100 to achieve a desired position or desired position profile along the track segment 12. The processor 52 in the segment controller 50 may also convert the position feedback signals 225 to a velocity feedback signal according to known methods and provide the velocity feedback signal to a velocity loop to achieve a desired speed or desired speed profile along the track segment 12.

The segment controller 50 also includes a communication interface 56 that receives communications from the central controller 170 and/or from adjacent segment controllers 50 in a path. The communication interface 56 extracts data from the message packets on the communication network and passes the data to a processor 52 executing in the segment controller 50. The processor may be a microprocessor. Optionally, the processor 52 and/or a memory device 54 within the segment controller 50 may be integrated on a field programmable array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates switching signals 72. Optionally, the processor 52 may incorporate the functions of the gate driver module 70 and directly generate the switching signals 72. The switching signals 72 are provided to the power conversion segment, in each track segment 12, where each power conversion segment includes multiple power switching devices 74. The switching devices 74 may be a solid-state device that is activated by the switching signal, including, but not limited to, transistors, thyristors, or silicon-controlled rectifiers.

In one embodiment, the processor 52 can also receive feedback signals from sensors providing an indication of the current operating conditions within the power segment or of the current operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver 70 generate switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 1:
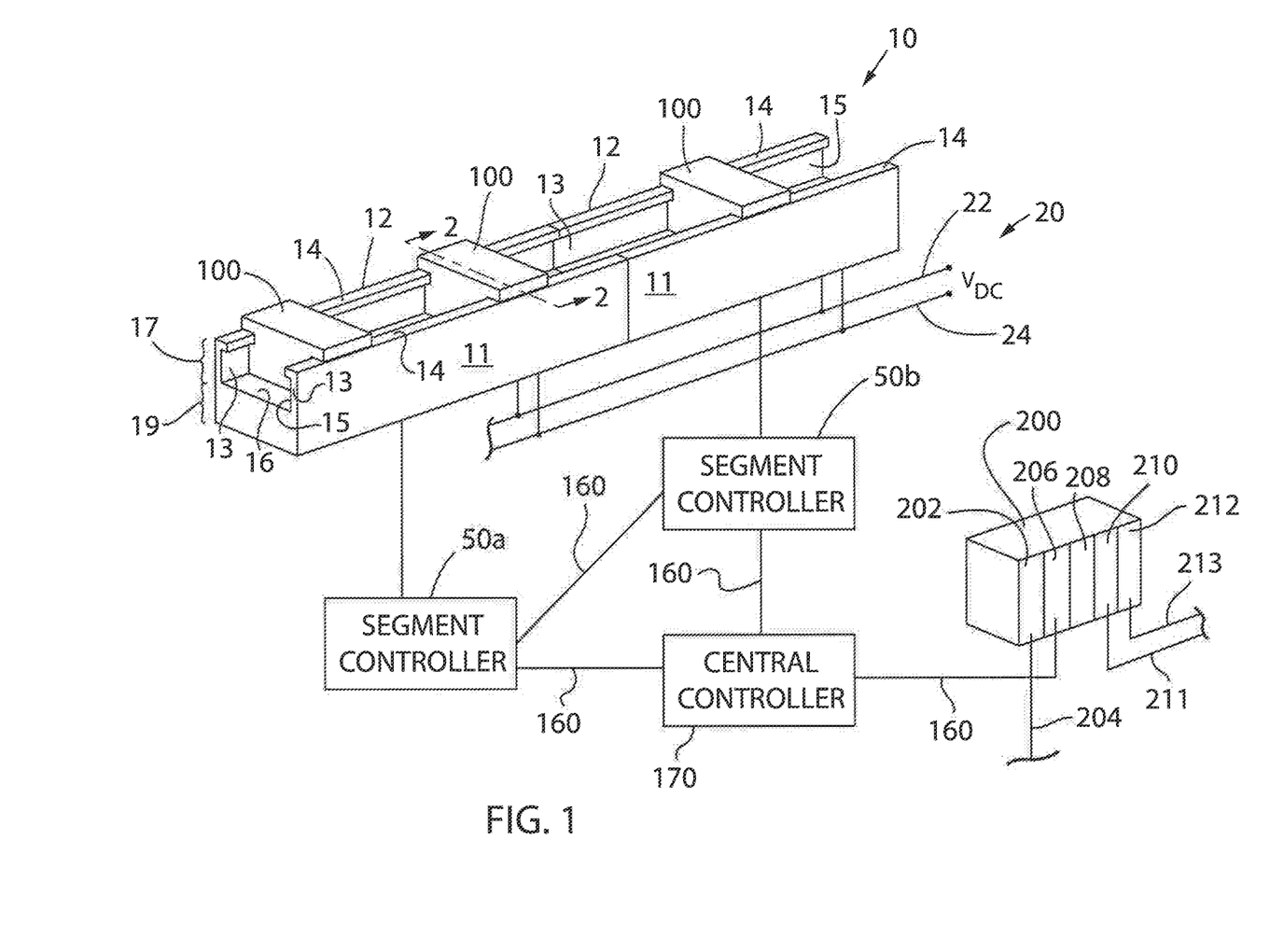
FIG. 1 is a schematic representation of an exemplary control system for a linear drive system according to one embodiment of the invention.

In operation, the central controller 170 receives a command from an external controller, such as the industrial controller 200 shown in FIG. 1, corresponding to a desired location, trajectory or motion for each mover 100. The command identifies one or more of the movers 100 and provides a desired operation of each identified mover 100. According to one embodiment of the invention, the desired operation may include a start location and a destination location between which the mover 100 is to travel. Optionally, the desired operation may simply include a destination location where the start location is the current location of the mover 100. The desired operation may further include, for example, a desired speed, or velocity, of travel as well as a desired rate of change of the speed, or acceleration, at which the mover 100 is to be driven to reach the destination.

According to one embodiment of the invention, the desired motion command, also referred to herein as "an order," includes a destination for a mover 100 and a maximum velocity of travel during the move. In some embodiments, the desired motion command also includes a maximum acceleration and deceleration of the mover 100 during the move and a desired operation at the end of the move, where the desired operation at the end of the move may include, for example, continue travel based on a subsequent move command, decelerate to a stop at the desired location, transition to a new speed based on a subsequent move command, and the like. As will be discussed in more detail below, these desired motion commands simplify programming of the movers for a technician by requiring only a destination and maximum speed for a move that may span multiple segments and automatically adapts operation of each mover 100 as it travels along the track 10.

Figure 7A:
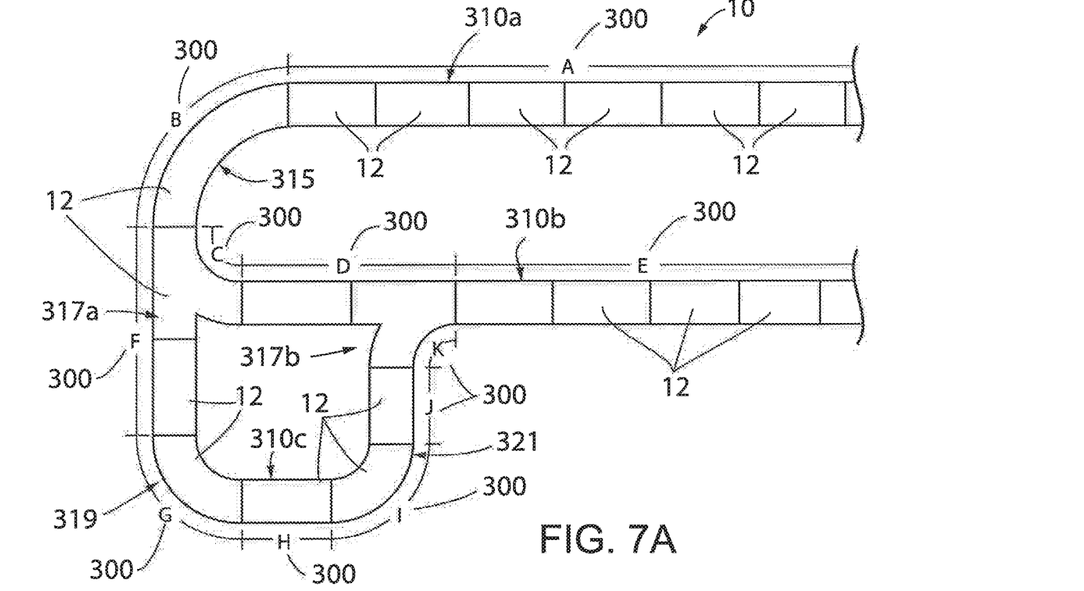
FIG. 7a is a partial top plan view of an exemplary track layout for the linear drive system of claim 1.

With reference next to FIG. 7a, an exemplary section of track 10 is illustrated. The track 10 includes multiple track segments 12 and is also divided into multiple zones 300, where a zone 300 may span a single track segment 12 or multiple track segments. In certain applications, a zone 300 may span less than an entire track segment 12. The illustrated section of track 10 includes three parallel straight paths 310, where the first straight path 310a and the second straight path 310b are parallel to each other and are joined at a first end by a curved path 315 and a first branch segment 317a. Each straight path 310a, 310b extends beyond the illustrated section at the opposite end. A third straight path 310c is shown parallel to and extends for only a portion of the length of the second straight path 310b. The first branch segment 317a defines two directions of travel for a mover 100. A first direction of travel extends orthogonal to each of the first and second straight paths toward a second curved path 319, which, in turn, connects to the third straight path 310c. A second direction of travel along the first branch segment 317a continues the curve defined by the first curved path 315 and completes the connection between the first straight path 310a and the second straight path 310b. A first end of the third straight path 310c is joined to the second curved path 319 and a second end of the third straight path 310 is joined to a third curved path 321. A second branch segment 317b is inserted into the second straight path 310b and similarly includes two directions of travel for a mover 100. The first direction of travel on the second branch segment 317b is a straight path aligned with and defining a portion of the second straight path 310b. The second direction of travel on the second branch segment 317b is a curved portion that is directed toward the end of the third curved path 321 and defines a route for a mover 100 to return to the second straight path 310b after traversing the third straight path 310c.

Figure 7B:
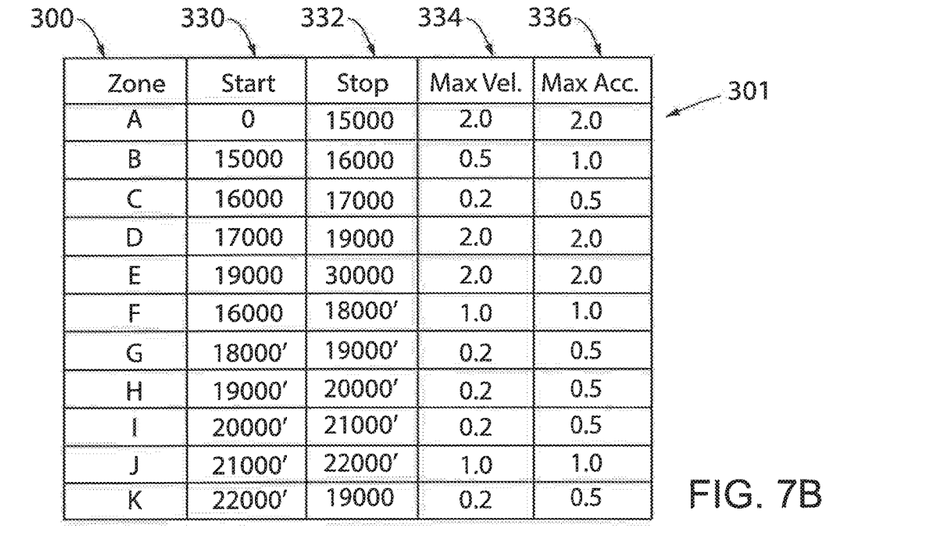

With reference also to FIG. 7b, an exemplary track configuration table 301 is provided that defines the location of each zone 300 along the track 10 by a start position 330 and a stop position 332 along with a maximum velocity 334 and a maximum acceleration 336 by which a mover 100 may travel while present in each zone 300, in one embodiment of the invention, each track segment 12 includes a track configuration table 301 corresponding to the length of the track segment 12. Optionally, a single track configuration table 301 is defined for the entire track 10 and a copy of the table is stored in each segment controller 50. In still other embodiments, the track configuration table 301 may be stored in the central controller 170 or the industrial controller 200.

The start position 330 and stop position 332 defines the location along the track 10 at which the zone exists. As seen in the track configuration table 301, the position may be defined in a linear manner along the length of the track 10. If a branch exists, where the mover 100 may travel along alternate paths, the position may be defined in a non-continuous manner. According to one option two paths may start initially with an identical range of positions, for example 0-1000. At a branch in the two paths, different positions such as 1000-2000 may be used for a first branch and 2000-3000 may be used for a second branch. Both paths may then resume counting at 3000 and continue in an increasing manner after the paths rejoin. According to a second embodiment, two paths may have the same numerical position yet utilize symbols, such as letters (e.g., "a" and "b") or identifying an alternate path as a "prime" path using an apostrophe. Still other methods of defining the linear positions in each zone and, particularly in zones defined along alternate paths may be utilized without deviating from the scope of the invention.

Within each defined zone, the illustrated embodiment includes a defined maximum velocity 334 and a defined maximum acceleration 336. These values limit the velocity and acceleration, respectively, of a mover 100 as it travels through a zone. These limits are applied automatically to a mover 100 and eliminate the need for an operator to program separate motion commands for each segment. Rather, the operator programs a single move command to a desired destination and a maximum or desired rate of operation for the mover 100 as it travels to the desired destination. The segment controller 50 may compare the maximum or desired velocity from the motion command to the maximum velocity 334 included within the track configuration table for each segment 12 of the track and limit the actual velocity of the mover to the lesser of the two values.

It is further contemplated that the track configuration table 301 may include other columns or settings for a mover 100 and/or for a track segment 12. According to one aspect of the invention, the track configuration table 301 may include a first maximum velocity and a second maximum velocity or a first maximum acceleration and a second maximum acceleration for each zone 300. The first maximum velocity and/or acceleration defines a maximum value of operation in a first direction of travel across the zone 300, and the second maximum velocity and/or acceleration defines a maximum value of operation in a second, or opposite, direction of travel across the zone 300.

According to another aspect of the invention, the track configuration table 301 may include an additional column, or columns, defining how each mover 100 is to operate as it approaches either end of the zone 300. The mover 100 may, for example, be configured to continue operation according to the set velocity and/or acceleration throughout the range of a zone 300. Optionally, a mover 100 may be configured to accelerate or decelerate to a new velocity based on an adjacent zone prior to entering the next zone.

According to yet another aspect of the invention, the track configuration table 301 may be dynamically configured. For example, a track 10 may be configured to transport multiple loads on the same movers 100. The central controller 170 or the industrial controller 200 may be configured to identify a particular load present on the movers 100 based, for example, on a control program executing on the industrial controller; an input device, such as a selector switch, identifying a particular load; a sensor generating different feedback signals to the controller as a function of the load detected; or by a load observer executing in the segment controller to determine a force required to move the load present on the mover 100. The configuration table 301 may receive a first set of values based on a first load and a second set of values based on a second load. When the controller detects the type of load present on the movers 100 or receives an input signal indicating the expected load on each mover 100, the controller may populate the track configuration table according to the expected load. It is contemplated that various other application requirements besides the type of load may be commanded or detected and form a basis for dynamically populating the configuration table 301 without deviating from the scope of the invention.

According to still another aspect of the invention, it is contemplated that a zone 300 may be defined over any length of travel. Although each zone 300 is illustrated as spanning one or more track segments 12, a zone 300 may start or end within a portion of a track segment 12. Further, each segment 12 may be divided into blocks 32, where a block 32 spans, for example, the length of a single coil 150 and a zone 300 may be defined by the start of a block, the end of a block, or at some point within the block 32. The configuration table 301 may also be configured to include a variable expression rather than a constant value, where the variable expression is used to change the value, for example, of the maximum velocity 334 along the length of a zone 300.

Figure 8:
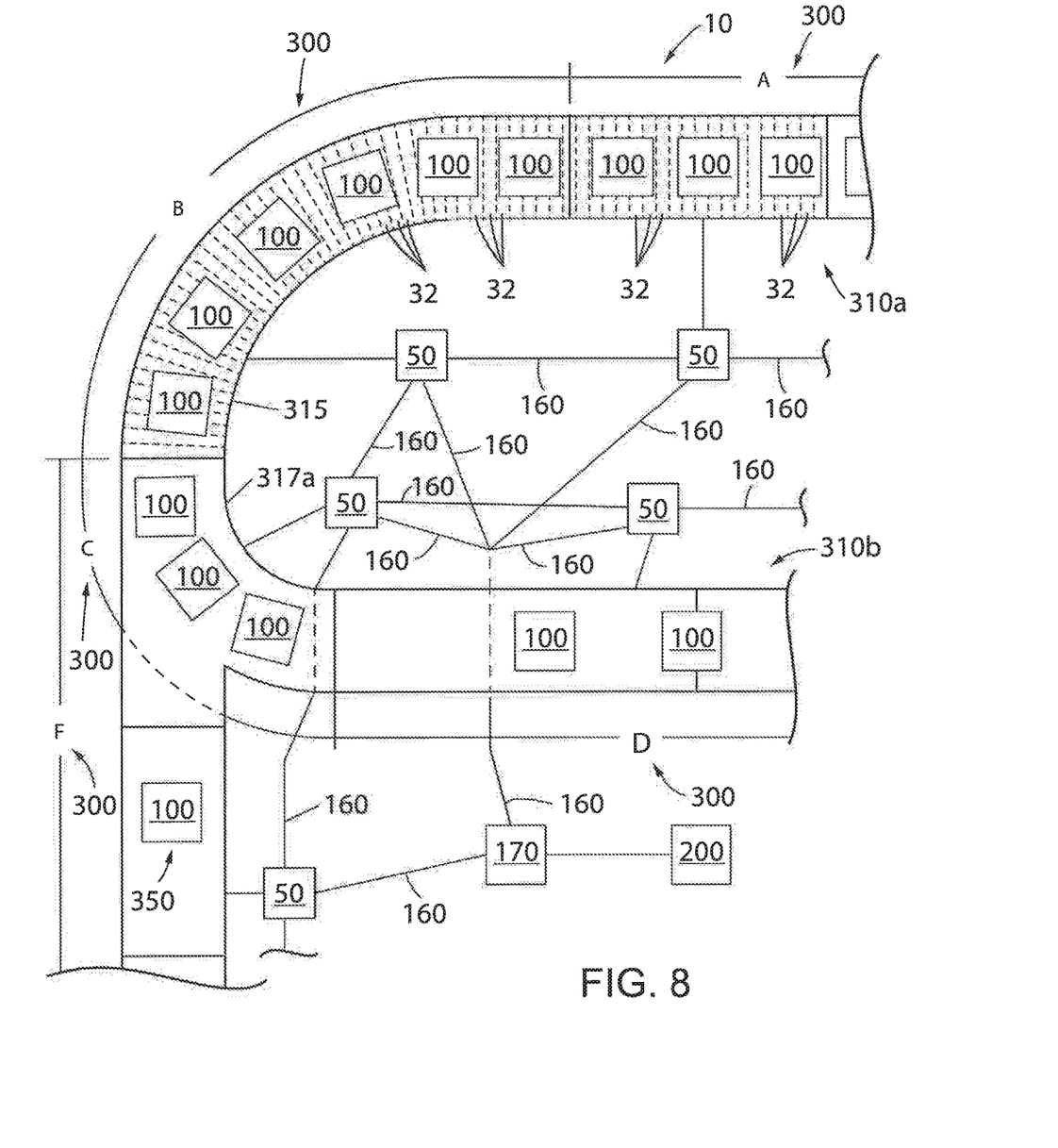
FIG. 8 is a partial top plan view of the exemplary track layout of FIG. 7a with a block diagram representation of controllers connected to track segments.

With reference next to FIG. 8, exemplary operation of multiple movers 100 traveling along a portion of an independent cart system will be discussed. The system is a portion of the track discussed above with respect to FIG. 7A and includes multiple movers 100 travelling along the track 10. An industrial controller 200 generates desired motion commands for each mover 100 travelling along the track 10. The desired motion command includes a maximum velocity at which the mover 100 is to travel and a location to which each mover is to travel. According to the illustrated embodiment, each mover 100 is commanded to move from zone A to a work station along zone E (see FIG. 7). A maximum velocity of travel for each mover 100 in the motion command is set to 2.5 m/s based on the expected loading and construction of the mover 100.

As each mover 100 travels along zone A, the mover 100 may be monitored for a predefined condition. For example, a load sensor may detect a combined weight of each mover 100 and the load present on the mover 100 as the mover 100 travels over a weighing segment 12. Optionally, a proximity sensor may be used to detect the presence or absence of an object on the mover 100. According to still another option, a control program executing in the industrial controller 200 may require that one mover 100 out of a predefined number of movers (e.g., 1 out of 100) be inspected. Regardless of the reason for selection, one mover 100 is identified as a selected mover 350. The motion command for the selected mover 350 requires that the selected mover 350 travel along the third straight path 310c for inspection, modification, removal, or any other operation as a result of the identified condition. Thus, when the selected mover 350 reaches the first branch segment 317a, it continues traveling straight while the other movers 100 continue traveling around the curve to the second straight path 310b. Further, it is contemplated that the maximum velocity 334 for each segment of the track other than the segments for the third straight path may be overwritten to slow travel of the movers 100 as the selected mover 350 travels along the third straight path, allowing the desired operation to be performed on the selected mover 350 and then command the selected mover 350 to be reinserted within its original location between the other movers 100. Optionally, if a load is to be inspected, the selected mover 350 may be commanded to stop at zone H along the third straight path. Once inspection is complete, an operator may provide an input signal, for example, via a push-button, indicating the selected mover 350 is ready to return to the second straight path 310b. The industrial controller 200 may be configured to receive the input signal and to overwrite the track configuration table 301 such that movers approaching the insertion point from the second branch segment 317a create a space for the selected mover 350 to rejoin the other movers 100. Once the selected mover 350 rejoins the other movers, the industrial controller 200 may again overwrite the track configuration table 301 to restore the original limits and original operation along the track 10. In any event, the operation of the track 10 is transparent to the operator requiring only that the mover 100 be initially programmed to move from zone A to zone E.

As the movers 100 travel between zones 300, the segment controller 50 limits operation of the mover 100 according to the values set in the track configuration table 301. As previously indicated, the motion command defines a desired velocity of 2.5 m/s. For discussion purposes, the configuration table 301 is set according to the values illustrated in FIG. 7B. Therefore, when a segment controller 50 for one of the track segments 12 within zone A receives the motion command, it compares the desired velocity of 2.5 m/s to the maximum velocity of 2.0 m/s assigned to zone A and limits the actual velocity of the mover 100 as it travels within zone A to 2.0 m/s.

As the mover 100 continues traveling to the desired destination, it transitions from zone A to zone B. At zone B, the segment controller 50 reads the maximum velocity 334 for zone B as 0.5 m/s. The maximum velocity 334 for zone B may be set lower than the maximum velocity for zone A to reduce centrifugal forces applied to a load and/or the mover 100 as the mover 100 goes around the curve in zone B. As a result of the reduced maximum velocity 334 in zone B, the segment controller 50 reduces the actual speed at which the mover travels within zone B to 0.5 m/s.

As another aspect of the invention, an additional column may be defined in the configuration table 301. The additional column may define whether a mover 100 is to decelerate to the new maximum velocity prior to entering the next zone 300 or after entering the next zone. As a mover 100 is travelling within a zone, the segment controller 50 further reads the additional column, if the mover 100 is to decelerate prior to entering the next zone 300, the segment controller 50 determines a difference between the actual speed at which the mover 100 is traveling within the current zone 300 (i.e., zone A) and the maximum speed at which the mover 100 is to travel in the next zone the mover is approaching (i.e., zone B). The segment controller 50 also determines an acceleration rate or a deceleration rate at which the mover 100 is to change speed depending on whether the maximum speed in the next zone is greater than or less than the actual speed in the current zone. The acceleration and/or deceleration rate may be included within a move command and there may be a maximum acceleration and/or deceleration rate stored within the configuration table 301 to limit the acceleration and/or deceleration in a manner similar to limiting the velocity. Once the segment controller 50 knows the difference in velocities between the two zones 300 and an acceleration or deceleration rate, the segment controller 50 determines a time or a distance of travel required for the mover 100 to transition between the two velocities and initiates the required change in speed at the appropriate time or distance before entering the next zone such that the mover 100 is at the desired velocity as it enters the next zone 300 if the mover 100 is to decelerate after entering the next zone, the segment controller 50 may simply determine the maximum velocity for the new zone and an acceleration or deceleration rate for the mover 100 once it enters the new zone and effect a change of speed of the mover 100 as a function of the maximum velocity and acceleration or deceleration rate in the new zone.

As the mover 100 continues traveling to the desired destination, it transitions again from zone B to zone C and from zone C to zone D. At zone C, the maximum velocity 334 is further reduced to 0.2 m/s. Operation to further reduce the actual velocity of the mover 100 occurs in a manner to that discussed above with respect to the transition from zone A to zone B. At zone D, the maximum velocity 334, however, returns to 2.0 m/s. Because the original motion command only instructed a mover 100 to travel from zone A to zone E, the original maximum velocity of travel for the move of 2.5 m/s is still present for the motion command. The transition between zones C and D, therefore, occur in a similar manner to the prior transitions except that the mover 100 will accelerate to a new maximum velocity 334 of 2.0 m/s rather than decelerating to either 0.5 m/s or 0.2 m/s.

According to another aspect of the invention, it is contemplated that portions of the track 10 may have no limits defined within the track configuration table 301. If a mover 100 is traveling within a portion of the track that is not defined in the configuration table 301, the segment controller 50 may use the values of desired operation directly as programmed in the motion command.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An independent cart system including multiple movers traveling along a linear drive system, the independent cart system comprising:
a plurality of movers, wherein each mover of the plurality of movers includes at least one drive magnet;
a track including a plurality of drive coils positioned along a length of the track, wherein the plurality of drive coils are selectively energized to establish an electromagnetic field interacting with the at least one drive magnet on each mover of the plurality of movers to drive each mover of the plurality of movers along the track and wherein the track includes a plurality of zones defined along the length of the track; and
a controller including:
a memory device operative to store a track configuration table, and
a processor operative to:
receive a desired motion command for each mover of the plurality of movers, wherein the desired motion command includes at least one of a desired acceleration and a desired velocity at which each mover of the plurality of movers is driven during the desired motion command,
receive a position feedback signal corresponding to a location for each mover of the plurality of movers along the length of the track,
read at least one of a maximum velocity and a maximum acceleration from the track configuration table corresponding to the location for each mover of the plurality of movers along the length of the track, and
limit one of an actual velocity and an actual acceleration of each mover of the plurality of movers to a lesser of the desired velocity or the maximum velocity and to a lesser of the desired acceleration or the maximum acceleration, respectively.

2. The independent cart system of claim 1 wherein:
the track configuration table defines at least one of the maximum velocity and the maximum acceleration for each of the plurality of zones along the length of the track, and
the processor identifies one of the plurality of zones in which each mover of the plurality of movers is located as a function of the location for each mover of the plurality of movers.

3. The independent cart system of claim 2 wherein a control program executing on the controller is operative to change at least one of the maximum velocity and the maximum acceleration in at least one of the plurality of zones as a function of the control program.

4. The independent cart system of claim 2 wherein at least one of the actual velocity and the actual acceleration is limited as a function of the track configuration table when each mover of the plurality of movers is driven between a first zone and a second zone.

5. The independent cart system of claim 2 wherein the controller is further operative to:
   read at least one of the maximum velocity and the maximum acceleration from the track configuration file for an approaching zone ahead of each mover of the plurality of movers;
   determine an acceleration distance as a function of a difference between the actual velocity and a new actual velocity of each mover of the plurality of movers in the approaching zone and as a function of the actual acceleration of each mover of the plurality of movers, wherein the new actual velocity is the lesser of the desired velocity or the maximum velocity in the approaching zone; and
   adjust the actual velocity of each mover of the plurality of movers to the new actual velocity starting at the acceleration distance before the approaching zone.

6. The independent cart system of claim 2 wherein:
   the track configuration table includes a direction of travel within each of the plurality of zones, and
   the track configuration table includes multiple maximum velocities or multiple maximum accelerations within one zone as a function of the direction of travel.

7. The independent cart system of claim 2 wherein:
   the track configuration table includes an identifier corresponding to one of a plurality of loads present on each mover of the plurality of movers, and
   the track configuration table includes multiple maximum velocities or multiple maximum accelerations within one zone as a function of the identifier.

8. The independent cart system of claim 2 wherein the desired motion command further includes a destination for each mover of the plurality of movers.

9. The independent cart system of claim 8 wherein:
   at least two zones overlap along the length of the track, and
   the controller is operative to select one of the at least two zones from which to read the maximum velocity or maximum acceleration as a function of the destination.

10. The controller of claim 1 wherein the track configuration table defines multiple maximum velocities or multiple maximum accelerations for each of the plurality of zones, and
   the controller is further operative to read one of the multiple maximum velocities or one of the multiple maximum accelerations for each mover of the plurality of movers located within the zone as a function of at least one of a direction of travel of each mover of the plurality of movers, a load present on each mover of the plurality of movers, and a desired destination of each mover of the plurality of movers.

11. A method for controlling operation of a plurality of movers traveling along a linear drive system, the method comprising the steps of:
   receiving a desired motion command at a controller for each mover of the plurality of movers, wherein the desired motion command includes at least one of a desired acceleration and a desired velocity at which each mover of the plurality of movers is driven during the desired motion command,
   receiving a position feedback signal at the controller corresponding to a location for each mover of the plurality of movers along a length of a track for the linear drive system,
   reading at least one of a maximum velocity and a maximum acceleration from a track configuration table corresponding to the location for each mover of the plurality of movers along the length of the track, and
   limiting one of an actual velocity and an actual acceleration of each mover of the plurality of movers to a lesser of the desired velocity or the maximum velocity and to the lesser of the desired acceleration or the maximum acceleration, respectively.

12. The method of claim 11 wherein the track configuration table defines a plurality of zones along the length of the track and wherein the track configuration table stores at least one of the maximum velocity and the maximum acceleration for each mover of the plurality of zones, the method further comprising the step of identifying one of the plurality of zones from the track configuration table with the controller in which each mover of the plurality of movers is located as a function of the position feedback signal received at the controller for each mover of the plurality of movers.

13. The method of claim 12 wherein a control program executing on the controller is operative to change at least one of the maximum velocity and the maximum acceleration in at least one of the plurality of zones as a function of the control program.

14. The method of claim 12 wherein at least one of the actual velocity and the actual acceleration is limited as a function of the track configuration table when each mover of the plurality of movers is driven between a first zone and a second zone.

15. The method of claim 12 further comprising the steps of:
   reading at least one of the maximum velocity and the maximum acceleration from the track configuration file for an approaching zone ahead of each mover of the plurality of movers;
   determining a deceleration distance as a function of a difference between the actual velocity and the new actual velocity of each mover of the plurality of movers in the approaching zone and as a function of the actual acceleration of each mover of the plurality of movers, wherein the new actual velocity is the lesser of the desired velocity or the maximum velocity in the approaching zone; and
   adjusting the actual velocity of each mover of the plurality of movers to the new actual velocity starting at the deceleration distance before the approaching zone.

16. The method of claim 12, wherein:
   the track configuration table includes a direction of travel within each of the plurality of zones, and
   the track configuration table includes multiple maximum velocities or multiple maximum accelerations within one zone as a function of the direction of travel.

17. The method of claim 12, wherein:
   the track configuration table includes an identifier corresponding to one of a plurality of loads present on each mover of the plurality of movers, and
   the track configuration table includes multiple maximum velocities or multiple maximum accelerations within one zone as a function of the identifier.

18. The method of claim 12 wherein the desired motion command further includes a destination for each mover of the plurality of movers.

19. The method of claim 18 wherein at least two zones overlap along the length of the track, the method further comprising the step of selecting one of the at least two zones from which to read the maximum velocity or maximum acceleration as a function of the destination.

20. A controller for an independent cart system, where the independent cart system includes multiple movers traveling along a linear drive system, the controller comprising:
- a memory device operative to store a track configuration table, wherein:
  - the track configuration table defines a plurality of zones along a length of a track on which a plurality of movers travel along the linear drive system,
  - the track configuration table includes at least one of a maximum velocity and a maximum acceleration for each of the plurality of zones, and
  - a processor identifies one of the plurality of zones in which each mover of the plurality of movers is located as a function of the location for each mover of the plurality of movers; and
- the processor operative to:
  - receive a desired motion command for each mover of the plurality of movers, wherein the desired motion command includes at least one of a desired acceleration and a desired velocity at which each mover of the plurality of movers is driven during the desired motion command,
  - receive a position feedback signal corresponding to a location for each mover of the plurality of movers along the length of the track,
  - read at least one of the maximum velocity and the maximum acceleration for one of the plurality of zones from the track configuration table corresponding to the location for each mover of the plurality of movers along the length of the track, and
  - limit one of an actual velocity and an actual acceleration of each mover of the plurality of movers to a lesser of the desired velocity or the maximum velocity and to the lesser of the desired acceleration or the maximum acceleration, respectively.

* * * * *